(12) United States Patent
Hu et al.

(10) Patent No.: US 8,620,621 B2
(45) Date of Patent: Dec. 31, 2013

(54) MAINTENANCE OF INTELLIGENT ASSETS

(75) Inventors: Xiao Wei Hu, Beijing (CN); Shaw-Ben Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 299 days.

(21) Appl. No.: 13/105,329

(22) Filed: May 11, 2011

(65) Prior Publication Data

US 2011/0295559 A1 Dec. 1, 2011

(30) Foreign Application Priority Data

May 31, 2010 (CN) .......................... 2010 1 0188581

(51) Int. Cl.
*G21C 17/00* (2006.01)
(52) U.S. Cl.
USPC ............................. 702/184; 702/182; 702/183
(58) Field of Classification Search
USPC ................................................. 702/182–185
See application file for complete search history.

(56) References Cited

U.S. PATENT DOCUMENTS

| 2003/0061004 | A1* | 3/2003 | Discenzo ...................... 702/182 |
| 2007/0118502 | A1* | 5/2007 | Aragones et al. ................. 707/2 |
| 2012/0010917 | A1* | 1/2012 | De Godoi .................... 705/7.12 |
| 2012/0130759 | A1* | 5/2012 | Davenport et al. .......... 705/7.12 |

OTHER PUBLICATIONS

Y. Zhao et al., "Self-Correlating Predictive Information Tracking for Large-Scale Production Systems", ICAC'09, Jun. 15-19, 2009, Barcelona, Spain, pp. 1-10.

* cited by examiner

*Primary Examiner* — Mischita Henson
(74) *Attorney, Agent, or Firm* — A. Bruce Clay

(57) ABSTRACT

A work performance acquisition module of an intelligent assets maintenance system obtains work performance data of intelligent assets from a device operation production control system. A status monitoring module obtains operation status data of the intelligent assets. A loss calculation module calculates a loss degree of the intelligent assets according to the obtained work performance and operation status data. A maintenance determining module determines whether the intelligent assets need maintenance according to the loss degree of the intelligent assets.

11 Claims, 2 Drawing Sheets

MAINTENANCE OF INTELLIGENT ASSETS

BACKGROUND

The present invention relates, in general, to intelligent assets, and more particularly, to maintaining intelligent assets.

Assets are devices that an enterprise uses to perform business operations, e.g., various processing, assembly, transportation and storage devices on various production lines. Intelligent assets are devices having built-in computing and communication capabilities, and they are capable of sending data, such as their own locations, status, performance, etc., to an asset management system.

An asset management system collects and stores data from assets for status checking, maintenance, problem diagnosis and repair of the assets. Asset management systems directly collect the data of the locations, statuses, performances, etc. of the assets, for example, the assets' temperatures, power consumptions and running speeds, etc., from the assets. It can be determined whether the assets are running or malfunctioning, but a degree in the reduction of the work efficiency cannot be determined, and, thus, a more timely and accurate asset maintenance plan cannot be formed.

BRIEF SUMMARY

According to one embodiment of the present invention, a system for maintaining intelligent assets comprises a processor and memory connected to the processor. A work performance acquisition module obtains work performance data of the intelligent assets from a device operation production control system. A status monitoring module obtains operation status data of the intelligent assets. A loss calculation module calculates a loss degree of the intelligent assets according to the obtained work performance and operation status data, and a maintenance determining module determines whether the intelligent assets need maintenance according to the loss degree of the intelligent assets.

According to one embodiment of the present invention, a method for maintaining intelligent assets obtains work performance data of the intelligent assets from a device operation production control system. Operation status data of the intelligent assets is obtained. A processor calculates a loss degree of the intelligent assets according to the obtained work performance data and the operation status data. A determination is made as to whether the intelligent assets need maintenance according to the calculated loss degree of the intelligent assets.

According to one embodiment of the present invention, a computer program product for maintaining intelligent assets comprises a computer readable storage medium having computer readable program code embodied therewith. The computer readable program code comprises computer readable program code configured to obtain work performance data of the intelligent assets from a device operation production control system. Computer readable program code is configured to obtain operation status data of the intelligent assets. Computer readable program code is configured to calculate a loss degree of the intelligent assets according to the obtained work performance data and the operation status data. Computer readable program code is configured to determine whether the intelligent assets need maintenance according to the calculated loss degree of the intelligent assets.

DETAILED DESCRIPTION

Figure 1:
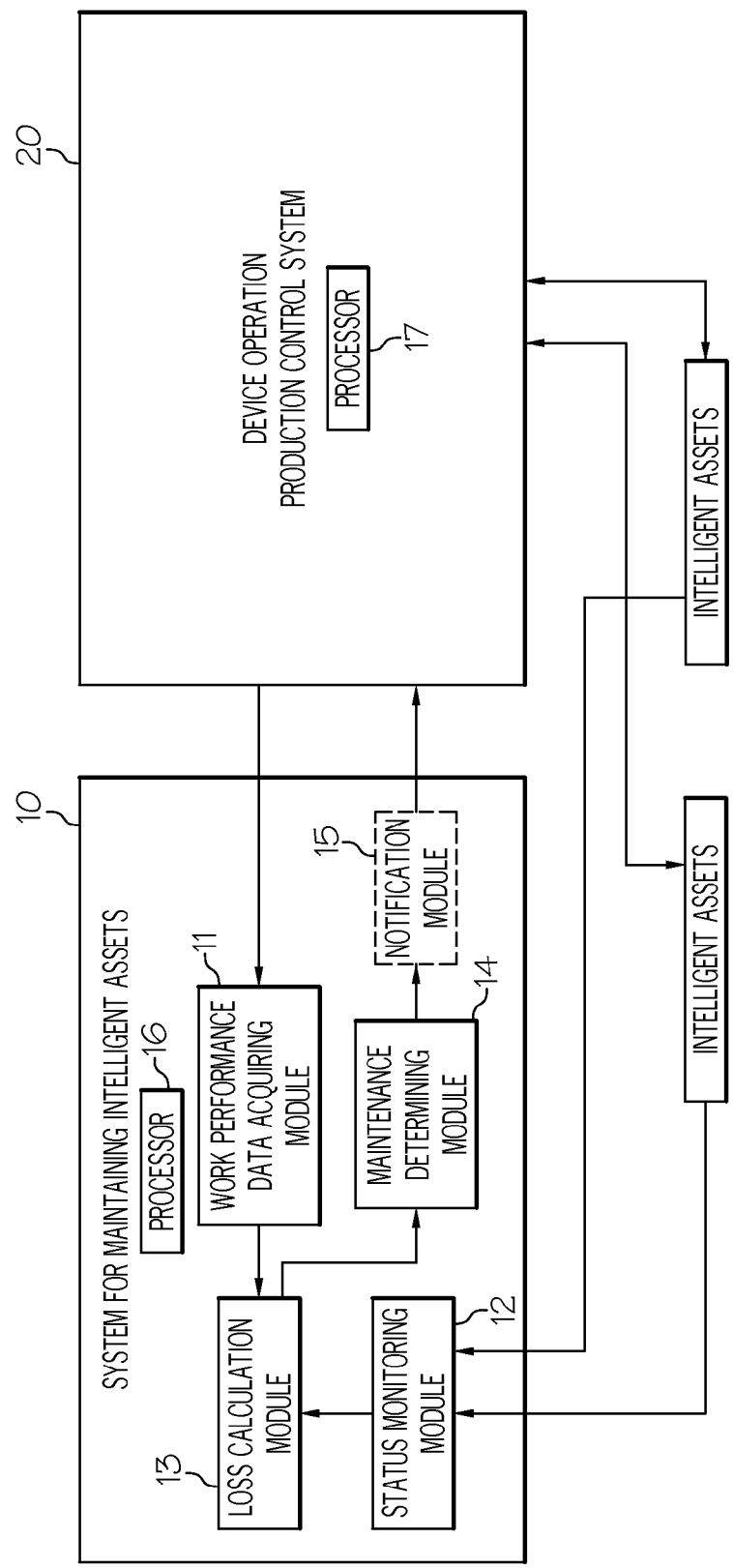
FIG. 1 shows a system for maintaining intelligent assets according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

FIG. 1 is one example of a system 10 for maintaining intelligent assets according to an embodiment of the present invention. As shown, the system 10 comprises the following modules: a work performance data acquiring module 11 configured to obtain work performance data of intelligent assets from a device operation production control system 20; a status monitoring module 12 for obtaining operation status data of the intelligent assets; a loss calculation module 13 configured to calculate a loss degree of the intelligent assets according to the obtained work performance and operation status data; and a maintenance determining module 14 configured to determine whether the intelligent assets need maintenance according to the loss degree of the intelligent assets. The system 10 further includes a processor 16.

Intelligent assets can be any set of intelligent assets for accomplishing specific business objectives, e.g., they can be work stations in a production line, water pumps in a water treatment process, conveying equipment, etc. The device operation production control system 20 can be any controller for controlling the operation of the intelligent assets to accomplish their business objectives, e.g., an assembly line controller, a pump controller, etc.

The system 10 for maintaining intelligent assets according to an embodiment of the present invention can obtain work performance data from the intelligent assets from the device operation production control system 20 via a network connection. The device operation production control system 20 may further include a processor 17. The work performance data may be the workload or output accomplished by the intelligent assets, e.g., the number of work pieces processed by a work station, or the discharge of a water pump.

The system 10 can obtain the operation status data of the intelligent assets from the intelligent assets directly via the network connection with the intelligent assets, or, of course, can obtain the operation status data of the intelligent asset via other devices, e.g., the device operation production control system 20. Various status data, such as power consumption, running speed and temperature, etc., of the intelligent assets can be obtained from the intelligent assets by using various sensors.

The device operation production control system 20 is connected via a network with the intelligent assets, controls the operation of the intelligent assets to accomplish the business objectives, and collects the work performance data from the intelligent assets.

According to an embodiment of the present invention, work performance data refers to the workload accomplished by the intelligent assets, and the operation status data is the power consumption of the intelligent assets. The loss calculation module 13 is configured to calculate a loss degree of the intelligent assets according to the obtained work performance data, and the operation status data is further configured to: calculate the ratio between the workload accomplished by the intelligent assets and the power consumption; calculate a loss degree of the intelligent assets according to the calculated ratio and the ratio between the workload accomplished by the intelligent assets at an initial time and the power consumption.

The initial time refers to the time when an intelligent asset is just put into operation and, thus, in excellent condition. At this time, the work efficiency of the intelligent asset is the highest, and, thus, the ratio between the workload accomplished by the intelligent asset (e.g., number of work pieces processed by the work stations, water amount pumped by the water pump, etc.) and the power consumption is the largest. With wear of the intelligent assets, its work efficiency will be gradually reduced, and the ratio between its accomplished workload and the power consumption is reduced correspondingly. Therefore, the loss degree of the intelligent assets can be determined according to the degree of reduction of the ratio between the workload accomplished by the intelligent assets and the power consumption as compared with the ratio at the initial time. When the calculated ratio is smaller than the ratio at the initial time, it can be determined that the intelligent asset has a loss in efficiency. The bigger the extent to which the calculated ratio is smaller than the initial ratio is, the bigger the loss degree of the intelligent asset is. When the calculated ratio is smaller than the ratio of the initial time by up to a predetermined threshold, e.g., to 20% or 30%, it can be determined that the intelligent asset has a severe loss, and thus needs to be repaired or replaced.

The loss of an intelligent asset will not only cause a reduction of work efficiency, but it will also cause a reduction of work performance of the intelligent asset under a specific work condition. Therefore, the loss degree of the intelligent asset can be determined by comparing the work performance of the intelligent asset in the current specific work condition and the work performance of the intelligent asset in the initial specific condition. The specific work condition can be, e.g., the highest temperature, or a state of full open of the pump. If the work performance of the intelligent asset under the current specific work condition is lower than that under the initial specific work condition, it can be determined that the intelligent asset has a loss; the more the work performance of the intelligent asset under the current specific work condition is reduced as compared with the work performance of the intelligent asset under the initial specific work condition, the bigger the loss degree of the intelligent asset is; if the work performance is reduced by up to a predetermined threshold, it can be determined that the intelligent asset has a severe loss, and needs to be repaired or replaced.

Therefore, according to another embodiment of the present invention, the work performance data is the workload accomplished by the intelligent asset, and the operation status data represents the specific work condition of the intelligent asset, and the calculation module 13 for calculating the loss degree of the intelligent asset according to the obtained work performance data and the operation status data is further configured to: calculate a loss degree of the intelligent asset by comparing the workload accomplished by the intelligent asset currently under the specific work condition with the workload accomplished by the intelligent asset initially under the specific work condition.

The system 10 for maintaining intelligent assets according to an embodiment of the present invention may further consider a group of intelligent assets (e.g., a group of intelligent assets which form a production line) as a larger intelligent asset, and calculates a loss degree of the larger intelligent asset according to the status data and work performance of the larger intelligent asset. For example, the work performance data of the entire production line may be the output of the production line, the status data of the production line may be the sum of the status data of all the assets in the production line, e.g., a sum of the power consumption of all the intelligent assets. The system 10 for maintaining intelligent assets according to an embodiment of the present invention may calculate the ratio between the output of the entire production line and the power consumption of the entire production line, and compare the ratio with the ratio between the output and the power consumption of the production line at the initial time. When the calculated ratio is smaller than the initial ratio, it can be determined that the production line has a loss. The bigger the extent to which the calculated ratio is smaller than the initial ratio is, the bigger the loss of the production line can be determined. When the calculated ratio is smaller than the ratio in the normal condition by up to a predetermined threshold, e.g., 20% or 30%, it can be determined that the production line has a severe loss, and thus its component assets need to be repaired or replaced. At this time, each intelligent asset, which is determined as having a severe or relatively severe loss, can be repaired or replaced one by one, and after each repair or replacement, the same method can be used to determine whether the loss of the entire production line is restored to be smaller than the threshold. When it is determined that the loss of the entire production line is smaller than the threshold, the repair or replacement of the remaining intelligent assets can be cancelled.

According to an embodiment of the present invention, the maintenance determining module 14 determines that an intelligent asset needs to be maintained in response to determining that the loss degree of the intelligent asset is larger than a predetermined threshold.

According to a further embodiment of the present invention, the system 10 for maintaining intelligent assets further comprises an optional notification module 15 configured to, in response to determining that the intelligent asset needs maintenance, send a notification for maintaining the intelligent asset to the device operation production control system 20.

According to an embodiment of the present invention, the device operation production control system 20 may maintain the intelligent asset according to the received notification for maintaining the intelligent asset. For example, the device operation production control system 20 may set the status of the corresponding intelligent asset as "to be maintained" according to the received notification, so as to stop the operation of the intelligent asset.

According to an embodiment of the present invention, the device operation production control system 20 may maintain the intelligent asset according to the notification and the relationship between the intelligent asset and other intelligent assets. For example, for an intelligent asset having backup assets, the backup assets may be initiated first to replace the intelligent asset, and then the status of the intelligent asset may be set as "to be maintained," thus, the operation of the production line will not be interrupted. For an intelligent asset without backup assets, the status of the intelligent asset is set as "to be maintained," and the operation of the entire production line has to be stopped.

According to some other embodiments of the present invention, the system 10 for maintaining intelligent assets may send the notification for maintaining the intelligent assets to other external or internal devices, so that the other external or internal devices may perform maintenance on the intelligent assets.

According to some embodiments of the present invention, the system 10 for maintaining intelligent assets resides in the asset management system. According to some other embodiments of the present invention, the system 10 for maintaining intelligent assets resides outside the asset management system. According to some yet other embodiments of the present invention, the system 10 for maintaining intelligent assets resides in both the asset management system and the device operation production control system.

Above is described the structure of the system for maintaining intelligent assets according to embodiments of the present invention by referring to the accompanying drawings. It should be pointed out that the above description and illustration are merely exemplary and illustrative, and not limitation to the present invention. The asset management system and the device operation production control system, according to the embodiments of the present invention may have more, less or different modules, and the connection and containment relationship among the modules may be different from what is illustrated and described.

Figure 2:
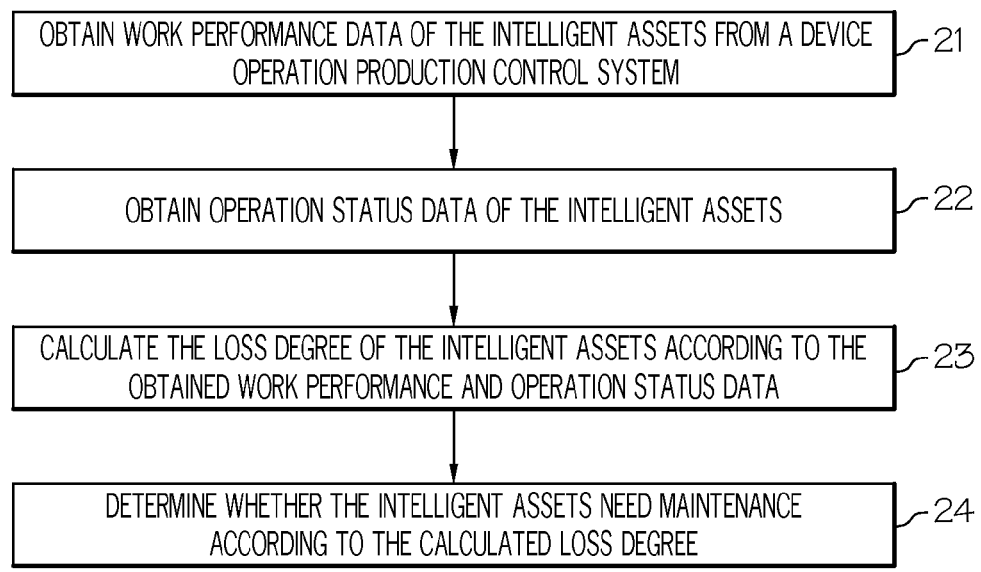
FIG. 2 shows a method for maintaining intelligent assets according to an embodiment of the present invention.

A method for maintaining intelligent assets according to an embodiment of the present invention is now discussed by referring to FIG. 2. As shown, the method comprises the following steps:

In step 21, work performance data of intelligent assets is obtained from a device operation production control system.

In step 22, operation status data of the intelligent assets is obtained.

In step 23, a loss degree of the intelligent assets is calculated according to the obtained work performance data and operation status data.

In step 24, it is determined whether the intelligent assets need maintenance according to the calculated loss degree.

According to an embodiment of the present invention, step 24 for determining whether the intelligent assets needs maintenance according to the calculated loss degree comprises the following sub-step: in response to determining that the loss degree of the intelligent assets is larger than a predetermined threshold, determining that the intelligent assets need maintenance.

According to an embodiment of the present invention, the method further comprises the following step: in response to determining that the intelligent assets need maintenance, sending a notification for maintaining the intelligent assets to the device operation production control system.

According to an embodiment of the present invention, the work performance data is the workload accomplished by the intelligent assets, and the operation status data is the power consumption of the intelligent assets, and step 23 for calculating the loss degree of the intelligent assets according to the obtained work performance data and the operation status data comprises the following sub-steps: calculating the ratio between the workload accomplished by the intelligent assets and the power consumption; calculating a loss degree of the intelligent assets according to the calculated ratio and the ratio between the workload accomplished by the intelligent assets and the power consumption at an initial time.

According to an embodiment of the present invention, the work performance data is the workload accomplished by the intelligent assets, and the operation status data represents a specific work condition of the intelligent assets, and step 23 for calculating the loss degree of the intelligent assets according to the obtained work performance data and the operation status data comprises: calculating a loss degree of the intelligent assets by comparing the workload accomplished by the intelligent assets currently under the specific work condition with the workload accomplished by the intelligent assets initially under the specific work condition.

According to an embodiment of the present invention, the method further comprises a step that the device operation production control system maintains the intelligent assets according to the received notification of maintaining the intelligent assets.

According to an embodiment of the present invention, the step that the device operation production control system maintains the intelligent assets according to the notification comprises: maintaining, by the device operation production control system, the intelligent assets according to the notification and relationships between the intelligent assets and other intelligent assets.

According to some embodiments of the present invention, the method is executed by the asset management system. According to some other embodiments of the present invention, the method is executed by other devices outside the asset management system. According to some yet other embodiments, the method is executed by the asset management system and the device operation production control system.

Above is described a method for maintaining intelligent assets according to embodiments of the present invention. It should be pointed out that the above description and illustration are only exemplary and illustrative, rather than as limitations to the present invention. The method for maintaining intelligent assets according to embodiments of the present invention may have more, fewer or different steps, and the relationships between the steps can be different from what is illustrated or described.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A system for maintaining intelligent assets, comprising:
a processor; and
a memory connected to the processor, wherein the memory is encoded with instructions and wherein the instructions comprise:
instructions for a work performance acquisition module to obtain work performance data comprising workload accomplished by the intelligent assets from a device operation production control system;
instructions for a status monitoring module to obtain operation status data comprising power consumption of the intelligent assets;
instructions for a loss calculation module to calculate a first ratio between the workload accomplished by the intelligent assets and the power consumption, and to calculate a loss degree of the intelligent assets according to said first ratio and a second ratio between a workload accomplished by the intelligent assets and the power consumption at an initial time, wherein an initial time comprises when the intelligent assets are just put into operation; and
instructions for a maintenance determining module to determine whether the intelligent assets need maintenance according to the loss degree of the intelligent assets.

2. The system of claim 1, wherein when the loss degree of the intelligent assets is greater than a predetermined threshold, instructions for the maintenance determining module to determine that the intelligent assets need maintenance.

3. The system of claim 1, further comprising a notification module configured to, in response to determining that the intelligent assets need maintenance, send a notification for maintaining the intelligent assets to the device operation production control system.

4. The system of claim 1, wherein the system is in an asset management system.

5. A method for maintaining intelligent assets, comprising:
obtaining work performance data comprising workload accomplished by the intelligent assets from a device operation production control system;
obtaining operation status data comprising power consumption of the intelligent assets;
calculating, with a processor, a first ratio between the workload accomplished by the intelligent assets and the power consumption, and calculating a loss degree of the intelligent assets according to said first ratio and a second ratio between a workload accomplished by the intelligent assets and the power consumption at an initial time, wherein an initial time comprises when the intelligent assets are just put into operation; and
determining whether the intelligent assets need maintenance according to the calculated loss degree of the intelligent assets.

6. The method of claim 5, wherein determining whether the intelligent assets need maintenance according to the calculated loss degree comprises:
when the loss degree of the intelligent assets is determined to be greater than a predetermined threshold, determining that the intelligent assets need maintenance.

7. The method of claim 5, further comprising:
when determining that the intelligent assets need maintenance, sending a notification for maintaining the intelligent assets to the device operation production control system.

8. The method of claim 5, wherein the method is executed by an asset management system.

9. A computer program product for maintaining intelligent assets, the computer program product comprising a non-transitory computer readable storage medium having computer readable program code embodied therewith, the computer readable program code comprising:
computer readable program code configured to obtain work performance data comprising workload accomplished by the intelligent assets from a device operation production control system;
computer readable program code configured to obtain operation status data comprising power consumption of the intelligent assets;
computer readable program code configured to calculate a first ratio between the workload accomplished by the intelligent assets and the power consumption, and to calculate a loss degree of the intelligent assets according to said first ratio and a second ratio between a workload accomplished by the intelligent assets and the power consumption at an initial time, wherein an initial time comprises when the intelligent assets are just put into operation; and
computer readable program code configured to determine whether the intelligent assets need maintenance according to the calculated loss degree of the intelligent assets.

10. The computer program product of claim 9, further comprising computer readable program code configured to determine whether the intelligent assets need maintenance according to the calculated loss degree comprises:
when the loss degree of the intelligent assets is determined to be greater than a predetermined threshold, computer readable program code configured to determine that the intelligent assets need maintenance.

11. The computer program product of claim 9, when determined that the intelligent assets need maintenance, computer readable program code configured to send a notification for maintaining the intelligent assets to the device operation production control system.

* * * * *